(12) United States Patent
Ross et al.

(10) Patent No.: US 8,832,388 B2
(45) Date of Patent: Sep. 9, 2014

(54) MANAGING SHARED MEMORY USED BY COMPUTE NODES

(75) Inventors: Jonathan Ross, Woodinville, WA (US); Jork Loeser, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 409 days.

(21) Appl. No.: 13/045,547

(22) Filed: Mar. 11, 2011

(65) Prior Publication Data

US 2012/0233409 A1  Sep. 13, 2012

(51) Int. Cl.
G06F 12/00 (2006.01)
G06F 12/08 (2006.01)

(52) U.S. Cl.
CPC .......... *G06F 12/0837* (2013.01); *G06F 12/084* (2013.01)
USPC ........... 711/152; 711/147; 711/149; 711/153; 711/154; 711/170

(58) Field of Classification Search
None
See application file for complete search history.

(56) References Cited

U.S. PATENT DOCUMENTS

| | | | |
|---|---|---|---|
| 5,522,058 A | 5/1996 | Iwasa et al. | |
| 6,862,608 B2 | 3/2005 | Buhlman et al. | |
| 2002/0019913 A1* | 2/2002 | Shimizu et al. | 711/141 |
| 2002/0178337 A1* | 11/2002 | Wilson et al. | 711/173 |
| 2003/0023702 A1 | 1/2003 | Kokku et al. | |
| 2003/0115402 A1* | 6/2003 | Dahlgren et al. | 711/1 |
| 2006/0230237 A1 | 10/2006 | Sakamoto | |
| 2009/0287885 A1 | 11/2009 | Kriegel et al. | |
| 2010/0333096 A1* | 12/2010 | Dice et al. | 718/102 |

OTHER PUBLICATIONS

Schmidt, et al., "Using Shared Memory for Read-Mostly RPC Services", Retrieved at << http://ieeexplore.ieee.org/stamp/stamp.jsp?tp=&arnumber=495457 , Proceedings of the Twenty-Ninth Hawaii International Conference on System Sciences, Jan. 3-6, 1996, pp. 141-149.

Hastings, Andrew B., "Transactional Distributed Shared Memory", Retrieved at << http://www.cs.cmu.edu/afs/cs/Web/People/abh/summary.html >>, Jul. 1992, pp. 12.

Nitzberg, et al., "Distributed Shared Memory:A Survey of Issues and Algorithms", Retrieved at << http://ieeexplore.ieee.org/stamp/stamp.jsp?tp=&arnumber=84877 >>, Computer-Distributed computing systems: separate resources acting as one, vol. 24, No. 8, Aug. 1991, pp. 52-60.

Chai, Chingwen., "Consistency Issues in Distributed Shared Memory Systems", Retrieved at << http://web.mit.edu/swg/ImagingPubs/Coregistration/maes_mi_image_reg.pdf >>, 2002, pp. 1-11.

* cited by examiner

*Primary Examiner* — Matthew Bradley
*Assistant Examiner* — Alan Otto
(74) *Attorney, Agent, or Firm* — Dan Choi; Judy Yee; Micky Minhas

(57) ABSTRACT

A technology can be provided for managing shared memory used by a plurality of compute nodes. An example system can include a shared globally addressable memory to enable access to shared data by the plurality of compute nodes. A memory interface can process memory requests sent to the shared globally addressable memory from the plurality of processors. A memory write module can be included for the memory interface to allocate memory locations in the shared globally addressable memory and write read-only data to the globally addressable memory from a writing compute node. In addition, a read module for the memory interface can map read-only data in the globally addressable shared memory as read-only for subsequent accesses by the plurality of compute nodes.

20 Claims, 3 Drawing Sheets

MANAGING SHARED MEMORY USED BY COMPUTE NODES

BACKGROUND

Many computers can improve access times to memory (e.g., RAM or random access memory) by using additional high-performance hardware memory caches that are local to individual compute nodes. Certain computers may be built with a hardware cache coherency domain. In such a design, multiple compute nodes can rely on hardware mechanisms to ensure that cached write-updates to a local memory of one compute node can be seen by other compute nodes on subsequent cached read-accesses to these duplicated cache memory locations.

Computers can also be built with multiple cache coherency domains. In this type of design, multiple compute nodes cannot rely on hardware mechanisms. As a result, caching may be prevented altogether, which can reduce average memory access performance. However, computing applications might use additional means (e.g., explicit cache flushes) to ensure data consistency. In the case where a computer design may ensure data consistency, sharing memory between compute nodes on such designs can become complicated because software programs may use additional means to ensure data consistency and these additional means can create additional computing latency.

If software components are being re-used, then sharing memory may become unworkable because existing software components typically cannot be extended by the measures used to ensure data consistency. As a consequence of having re-usable data components that are not able to be extended to ensure data consistency at a software level, data used by multiple compute nodes may need to be stored multiple times on a computer, which can consume more memory resources than a shared memory scenario where the data can be stored just once. For example, an existing technique that can provide the abstraction of shared memory to applications across multiple computers is called distributed shared memory (DSM). However, one implementation of DSM can store multiple copies of the same data at multiple compute nodes, so each of the compute nodes has efficient read accesses.

Such solutions often rely on additional memory being available or hardware concurrency mechanisms that may make the hardware more expensive to manufacture. In the addition, the use of additional coherence protocols can make the hardware protocols and software protocols more complicated and slower.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various embodiments are described for managing shared memory used by a plurality of compute nodes. An example system can include a shared globally addressable memory to enable access to shared data by the plurality of compute nodes. A memory interface can process memory requests sent to the shared globally addressable memory from the plurality of processors. A memory write module can be included for the memory interface to allocate memory locations in the shared globally addressable memory and write read-only data to the globally addressable memory from a writing compute node. In addition, a read module for the memory interface can map read-only data in the globally addressable shared memory as read-only for subsequent accesses by the plurality of compute nodes.

An example method can manage shared memory used by a plurality of compute nodes. The method can include the operation of allocating memory in a shared globally addressable memory using a memory write module. Read-only data can be written to allocated memory of the shared globally addressable memory. The read-only data can then be published as being readable by reading compute nodes via the shared globally addressable memory. A further operation can be mapping shared globally addressable memory for reading by the reading compute nodes. Access can be allowed to read-only data in the shared globally addressable memory by the reading compute nodes.

DETAILED DESCRIPTION

Figure 1:
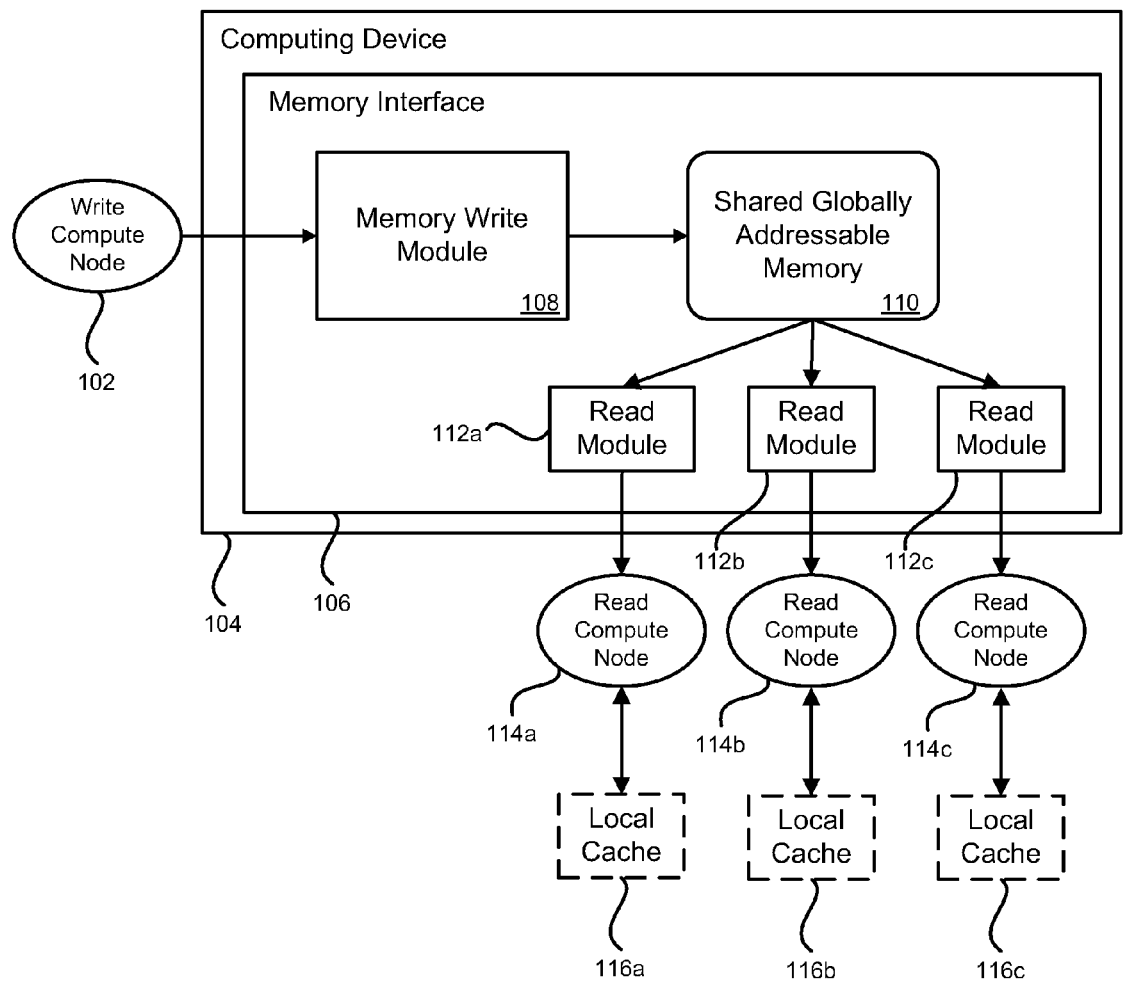
FIG. 1 is a block diagram illustrating an example of a system for managing shared memory used by a plurality of compute nodes.

Reference will now be made to the examples illustrated in the drawings, and specific language will be used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

This technology can expose an abstraction of read-only shared memory to programs executing on a group of compute nodes. Such an abstraction can be useful for many practical applications, where one compute node generates data and other multiple compute nodes consume this data afterwards. The shared data can be marked as being read-only or constant data once created, and the shared data can be safely shared between and/or cached on multiple compute nodes without the danger of data inconsistencies. The term read-only data or constant data means that the data can be expected to remain unchanged after a write compute node has written the data. Individual compute nodes can also cache read-only data items in local compute node caches to increase performance on data accesses.

This technology for a shared read-only memory abstraction can ensure data consistency on non-cache-coherent computer designs, while allowing sharing and hence re-use of data and memory resources. A shared read-only memory abstraction is useful as a transparent means for software programs to safely re-use memory resources on non-cache-coherency computers.

Technology can be provided for managing shared memory used by a plurality of compute nodes. FIG. 1 illustrates an example system that can include a shared globally addressable memory 110 to enable access to shared data by the plurality of compute nodes 102, 114a-c for a computing device 104. Each of the compute nodes may be an individual processor in a clustered computing system (e.g., personal computer or a server) or a computing processor that is part of a multi-core processor.

The memory or shared globally addressable memory 110 can be a globally addressable resource which may be addressed and accessed by any of the compute nodes or processors which request data from the shared globally addressable memory. This globally addressable access for the memory is in contrast to computing clusters that do not generally allow direct access to a centralized memory or remote. Examples of computer memory hardware that can be used for storing data in this technology can be: RAM (Random Access Memory which may include DRAM and DDR SDRAM), Flash memory, phase change memory, and other types of readable computer memory. A memory interface 106 can process memory requests sent to the shared globally addressable memory from the plurality of processors 102, 114a-c. The hardware interface of the memory interface can be a hardware memory controller to manage the flow of data to and from the shared globally addressable memory. In addition, a software interface portion of the memory interface can manage the hardware controller and include services for the memory management subsystem that are available to the computing nodes (e.g., allocation, mapping, etc.) For example, the services of the memory interface may be accessed via the operating system or be part of a device driver for memory that is part of the system software. The software interfaces can provide an abstraction for managing and accessing hardware facilities described for this technology.

A memory write module 108 can be provided for the memory interface to allocate memory locations in the shared globally addressable memory. The memory write module can write to the globally addressable memory received in a request from a writing compute node. The data written by one node can then be mapped as read-only by other nodes which can block other nodes from writing to memory locations already designated as read-only. The data written and then mapped as read-only can be called "read-only data" because the initial write of data will be subsequently treated by a plurality of nodes as read-only. The memory write module can be accessible as part of services of the memory management subsystem that are available to the computing nodes.

The writes or write operations can be written immediately to the shared globally addressable memory. The immediate writes can include flushing any write caches the writing compute node 102 may have. These write operations can be immediate because cache concurrency is not needed to be provided to other nodes. In other words, the memory write module can ensure that data desired to be shared is current by immediately flushing a write cache of the writing compute node.

Read modules 112a-c can be included with the memory interface to map read-only data in the globally addressable shared memory as read-only for subsequent accesses by the plurality of reading compute nodes 114a-c. More specifically, the memory write module can publish access to read-only data in the shared globally addressable memory. As a result, read-only access can be enabled for the plurality of other compute nodes which desire to read the read-only data. In one configuration, a record of the publication of the read-only memory locations can be cached at the individual read compute nodes, and then the compute nodes may know which memory locations are not writable when making write memory requests. Alternatively, the recording of the publication of the read-only memory locations can performed using translation structures (e.g., translation lookaside buffers or TLBs) of the local processor, programmed by the memory management subsystem to mark pages as read-only (e.g., write once-read many). In another possible implementation, a record of the published access to the read-only data is stored within the memory interface and when reading or writing compute nodes try to access the read-only memory, then the memory interface can block write access to the read-only memory and allow read access to the protected read-only memory. In addition, the read modules can be accessible as part of services of the memory management subsystem that are available to the computing nodes.

Read operations on the read-only data in the shared globally addressable memory can be made through the memory interface by compute nodes. If the compute node requesting the read operation did not write the read-only data, then the read can be fulfilled by fetching the read-only data directly from the shared globally addressable memory. This is in contrast to cache-coherent systems which query other caches for modified copies before accessing memory. Since this technology disallows subsequent writes to the read-only data, the reads can be fully cached and cache misses may be faster than hardware caching systems because other caches do not need to be queried on a cache read miss in the local cache. In contrast to previous memory schemes, the operating system can provide restricted access (i.e., read only access) to designated memory to accommodate a lack of memory coherence, but the technology can still allow caching optimizations in the hardware.

When the read-only data locations are first allocated and written to, an allocation list can be created with a record of compute nodes that are accessing the memory. Each time a compute node references the memory, the compute node can be added to the access list. When a compute node has completed the compute nodes' access to the read-only memory, then the system can remove the compute node from the access list. If at some later point in time, a garbage collection routine executes to free up memory, this read-only memory can be freed up when there are no more read references to the memory in the access list. Alternatively, a common reference counting mechanism can be configured using various data structures to track when the memory is being accessed by at least one compute node. Then the system can determine when no more processes are reading from the memory and the memory can be deallocated. Examples of data structures for a common reference counting mechanism may include a reference table with counts, a linked list of compute nodes accessing the memory, or other useful data structures for tracking whether compute nodes are referencing the shared globally addressable memory.

Computing applications or software using the shared globally addressable memory can use an application program interface (API) that is part of the memory interface 106 in an operating system. The API can enable a writing compute node to write once to the shared globally addressable memory and enable reading compute nodes to read the read-only data an unlimited number of times. Functions of the API can be exposed to applications using the API interface calls. Because the data is not expected to be modified then a data coherency means may not be needed or used in relation to the API.

In one example configuration of the technology, the read module may allow the compute nodes to cache copies of the read-only memory. Such copies of the read-only memory may be cached in a local cache 116a-c so that the read compute nodes 114a-c can more quickly access the read-only data.

In addition to the globally addressable memory illustrated in FIG. 1, the system can include other types of memory access such as read-write memory that is shared but is controlled by other access mechanisms that have higher overhead than the present technology. The access mechanisms may include hardware cache concurrency mechanisms or locking means to control access to the read-write memory. Many other types of memory schemes can be used simultaneously with the present technology.

Figure 2:
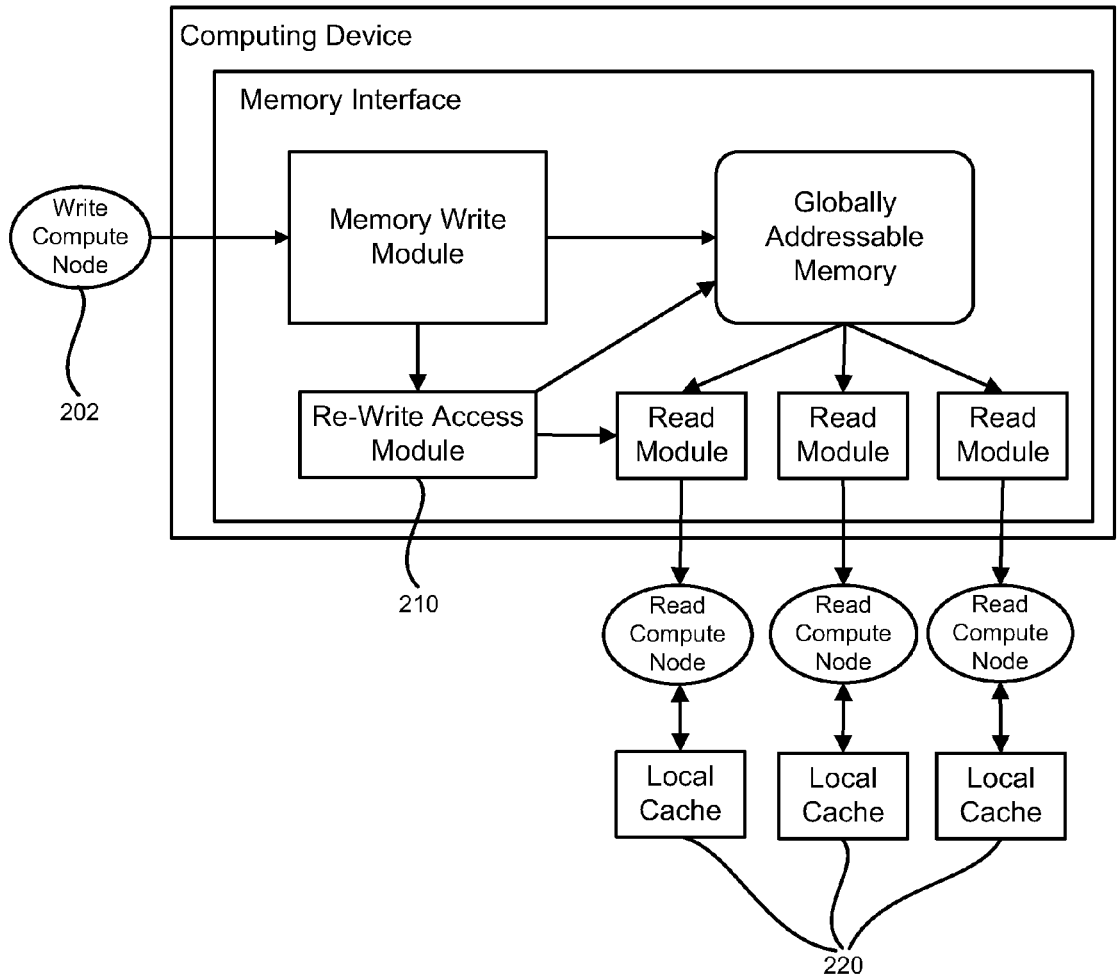
FIG. 2 is a block diagram illustrating an example of a system for managing shared memory used by a plurality of compute nodes, which includes a re-write access module.

FIG. 2 illustrates an additional example of a system for managing shared memory used by a plurality of compute nodes. The system illustrated in FIG. 2 can allow a read-only portion of memory to be updated by the original writing compute node. In addition to the components already described in reference to FIG. 1, the system can include a re-write access module 210 to allow a write compute node to restrict access to the read-only data in the shared globally addressable memory while the read-only data is updated.

The re-write access module 210 can receive a notification from the write compute node 202 which originally wrote the read-only data, and this notification can inform the memory write module that the read-only data is going to be updated. If other write compute nodes, which did not originally write the read-only data, try to update the read-only data, those write compute nodes may be denied update access.

The re-write notification module can notify the read module(s) that the read-only data is about to be updated and is not readable until after the read-only data is updated. After the write compute node has modified or updated the read-only data, then the read module(s) can be notified that read compute nodes can read from the protected portions of the shared globally addressable memory or read-only portions of the memory. The read compute nodes may also update local caches 220 to contain the re-written data, if desired.

In another configuration, the re-write notification module can use a data structure in the shared globally addressable memory with the read-only data to block read access to the read-only data when a re-write update from the write compute node is taking place. For example, a lock can be set on the read-only data to stop read compute nodes from reading the data and a notification can be provided to compute nodes that have already read the specific read-only data that read-only data in their local cache is stale. When the lock is released, the read compute nodes may be notified that their local caches can be re-retrieved and used.

Figure 3:
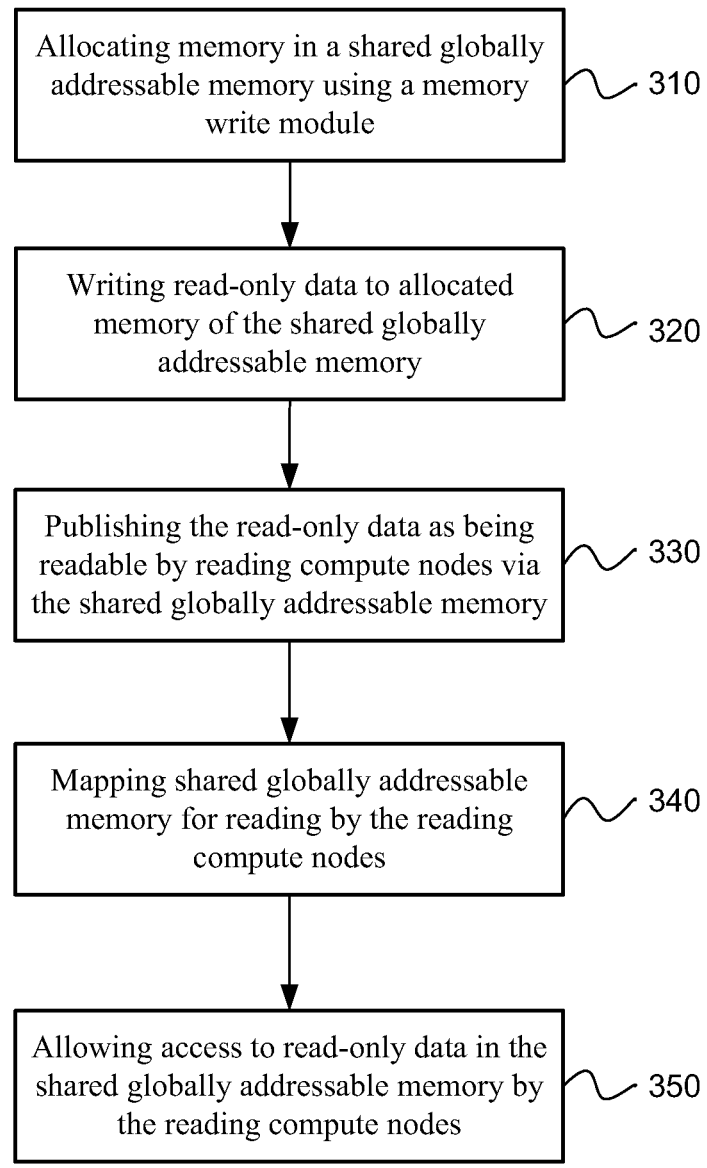
FIG. 3 is a flowchart illustrating an example of a method for managing shared memory used by a plurality of compute nodes.

FIG. 3 illustrates an example method for managing shared memory used by a plurality of compute nodes. The method can include the operation of allocating memory in a shared globally addressable memory using a memory write module, as in block 310. Read-only data can then be written to the allocated memory of the shared globally addressable memory, as in block 320. The read-only data is designated as read-only data either in the memory itself or using the read modules that enable read access to the globally addressable memory.

The writing caches of the writing compute nodes can be flushed in order to immediately write read-only data to the shared globally addressable memory. This means the cache writes can be flushed immediately to the shared globally addressable memory, especially when the memory is marked as non-cacheable. In addition, the access to the shared globally addressable memory for writing the read-only data can be enabled for a write compute node using the memory write module. The memory write module can be associated with or located in a memory interface, which may be a memory driver or an operating system module and/or interface.

The read-only data can be published as being readable to reading compute nodes via the shared globally addressable memory or alternatively, via the memory interface, as in block 330. In addition, the shared globally addressable memory can be mapped for reading by the reading compute nodes, as in block 340. The shared globally addressable memory can be mapped as non-cacheable. When the shared globally addressable memory is mapped as non-cacheable, then data read by the read compute nodes can be read directly from the shared globally addressable memory without any local caching for each separate node.

Access to read-only data in the shared globally addressable memory can be allowed for the reading compute nodes, as in block 350. More specifically, the compute nodes can be allowed to cache copies of the read-only data and then use the read-only data.

Instead of offering one abstraction of uncached shared memory, the present technology can offer multiple abstractions of shared memory to applications. This allows the applications to use faster or slower memory configurations based on the actual needs of the computing applications. One abstraction of shared memory is shared memory that can be written to by one compute node or multiple compute nodes. This memory can be mapped non-cacheable, so that write updates can be written to memory immediately, while subsequent reads (from other compute nodes) can fetch the updated data from memory. A second abstraction of shared memory is an allocated block of shared memory that can be written just once by one compute node, and subsequently is readable by multiple compute nodes. After the initial writes have been performed, the writing node can ensure that data is written to main memory (e.g., by flushing its caches). Multiple nodes can now map to the memory with caching enabled, and can benefit from the performance improvements of cached read-only accesses.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Furthermore, the described features, structures, or characteristics may be combined in any suitable manner in one or more embodiments. In the preceding description, numerous specific details were provided, such as examples of various configurations to provide a thorough understanding of embodiments of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A system comprising: a plurality of compute nodes including a writing compute node and multiple reading compute nodes, the multiple reading compute nodes including a first reading compute node having a first local cache and a second reading compute node having a second local cache; a shared globally addressable memory configured to enable access to shared data by the plurality of compute nodes; and a memory interface configured to: process memory requests sent to the shared globally addressable memory from the plurality of compute nodes, allocate a read-only memory location in the shared globally addressable memory and write read-only data provided by the writing compute node to the read-only memory location in the shared globally addressable memory, map the read-only data in the globally addressable shared memory as read-only for subsequent accesses by the multiple reading compute nodes while allowing the writing compute node to perform an update on the read-only data in the read-only memory location, provide the multiple reading compute nodes with a first notification that the read-only data is going to be updated and thus unreadable, and provide the multiple reading compute nodes with a second notification after the update that the read-only data is readable, wherein the first reading compute node is configured to cache the read-only data in the first local cache and the second reading compute node is configured to cache the read-only data in the second local cache.

2. The system as in claim 1, wherein the memory interface is configured to publish an indication when the read-only data is written that read-only access to the read-only data is available to the multiple reading compute nodes.

3. The system as in claim 1, wherein the multiple reading compute nodes are configured to perform read operations to fetch the read-only data directly from the shared globally addressable memory.

4. The system as in claim 1, wherein the shared globally addressable memory is mapped as non-cacheable.

5. The system as in claim 4, wherein the memory interface is configured to write the read-only data by immediately flushing a write cache of the writing compute node to the shared globally addressable memory.

6. The system as in claim 1, wherein the memory interface comprises a hardware interface configured to manage data flow to and from the shared addressable memory and a software interface configured to manage the hardware interface and provide services to the plurality of compute nodes.

7. The system as in claim 1, wherein no cache coherency mechanism is present in the system.

8. The system as in claim 1, wherein the memory interface is configured to flush a write cache of the writing compute node to cause the read-only data to be written to the shared globally addressable memory.

9. The system as in claim 1, wherein the memory interface is a memory driver or an operating system interface.

10. A method comprising: allocating a memory location in a memory shared by a writing compute node, a first reading compute node having a first local cache, and a second reading compute node having a second local cache; writing, to the allocated memory location of the memory, read-only data provided by the writing compute node; publishing an indication that the read-only data is readable by the first reading compute node and the second reading compute node, wherein the read-only data is cached in the first local cache and the read-only data is also cached in the second local cache; after the read-only data has been written to the allocated memory location, providing the writing compute node with write access to perform an update on the read-only data while restricting the first reading compute node and the second reading compute node from updating the read-only data; notifying the first reading compute node and the second reading compute node that the update will be performed and the read-only data will not be readable during the update; and after the update completes, notifying the first reading compute node and the second reading compute node that the read-only data is again readable.

11. The method as in claim 10, further comprising flushing a write cache of the writing compute node in order to write the read-only data to the memory.

12. The method as in claim 11, wherein the write cache is flushed immediately responsive to a write operation by the writing compute node.

13. The method as in claim 10, further comprising mapping the memory as non-cacheable.

14. The method as in claim 13, further comprising fetching the read-only data from the memory before the read-only data is cached in the first local cache.

15. The method as in claim 10, further comprising detecting that the first reading compute node is attempting to update the read-only data; and denying update access to the first reading compute node to prevent the read-only data from being updated.

16. The method as in claim 10, performed on a computing system that is not cache-coherent.

17. The system as in claim 1, wherein the shared globally addressable memory is a random access memory, a flash memory, or a phrase change memory.

18. A computing device comprising: a plurality of compute nodes including a writing compute node and multiple reading compute nodes, the multiple reading compute nodes including a first reading compute node having a first local cache and a second reading compute node having a second local cache; a memory that provides access to shared data by the plurality of compute nodes; and a memory interface that: allocates a memory location in the memory for read-only data provided by the writing compute node, the read-only data being part of the shared data, writes the read-only data to the memory location of the memory on behalf of the writing compute node, provides the writing compute node with write access to perform an update on the read-only data while restricting the multiple reading compute nodes from updating the read-only data, provides a notification that the read-only data is not readable until after the update, and provides, after the update, another notification that the read-only data is readable, wherein the first reading compute node caches the read-only data in the first local cache and the second reading compute node caches the read-only data in the second local cache.

19. The computing device of claim 18, wherein the memory is a random access memory, a flash memory, or a phase change memory.

20. The computer device of claim 18, wherein the memory interface deallocates the memory location using a garbage collection routine or a counting mechanism.

* * * * *